Figure 1:
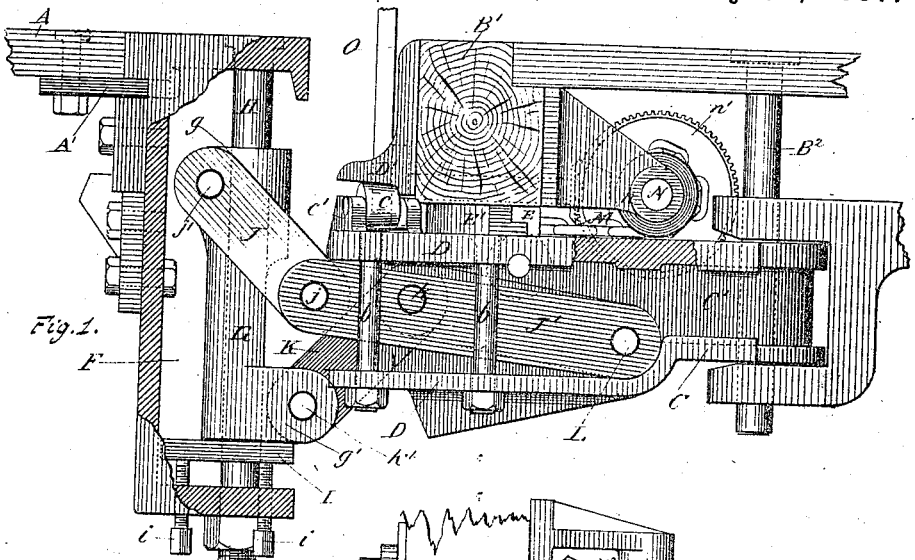

(No Model.)

A. SELKIRK.
COUPLING FOR LOCOMOTIVES.

No. 363,856.  Patented May 31, 1887.

Witnesses:
Charles Selkirk.
Charles Witherson

Alexander Selkirk,
Inventor.

(No Model.) 4 Sheets—Sheet 2.

A. SELKIRK.
COUPLING FOR LOCOMOTIVES.

No. 363,856. Patented May 31, 1887.

Witnesses:
Charles Siesent
Charles Witherow

Alexander Selkirk,
Inventor.

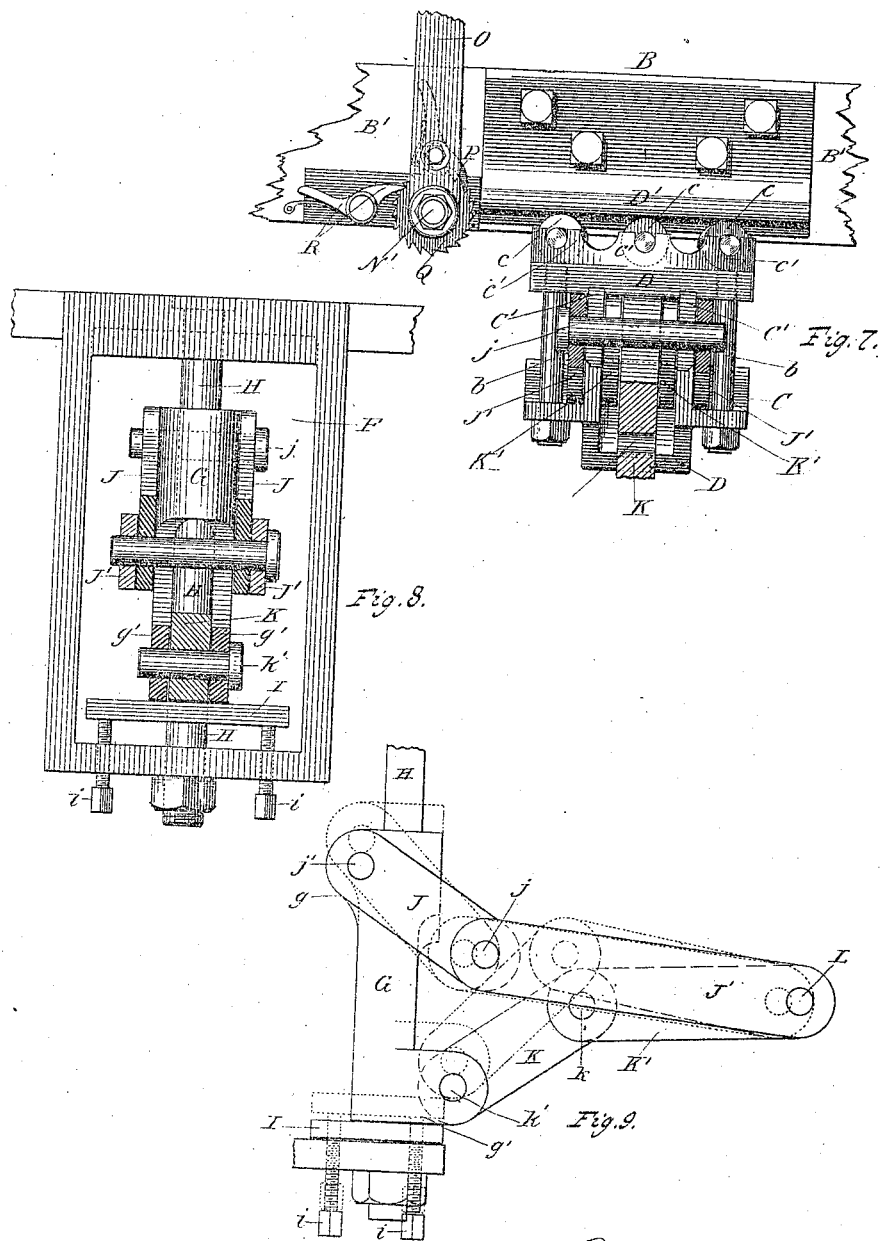

(No Model.)

A. SELKIRK.
COUPLING FOR LOCOMOTIVES.

No. 363,856.

4 Sheets—Sheet 4.

Patented May 31, 1887.

Witnesses:
J. C. Turner
J. C. Doubleday.

Alexander Selkirk
Inventor.

UNITED STATES PATENT OFFICE.

ALEXANDER SELKIRK, OF ALBANY, NEW YORK.

COUPLING FOR LOCOMOTIVES.

SPECIFICATION forming part of Letters Patent No. 363,856, dated May 31, 1887.

Application filed June 9, 1886. Serial No. 204,626. (No model.)

*To all whom it may concern:*

Be it known that I, ALEXANDER SELKIRK, a citizen of the United States, and a resident of Albany, in the county of Albany and State of New York, have invented new and useful Improvements in Traction-Increasing Couplers for Locomotives, of which the following is a specification.

My invention relates to traction-increasing couplers employed between locomotives and their tenders for transferring a portion of the weight of the latter to the driving-wheels of the former when the locomotive is pulling or backing; and it consists of the combinations of devices, parts, and elements, hereinafter described, and set forth in the claims.

The objects of my invention are, first, to provide between a coupling-bar jointed with the tender and a piece jointed with the locomotive two separate and independently-operating toggle-levers, which will alternately operate to support the forward end of the coupling-bar and cause the latter to become a lifting device and support to the forward end of the tender, accordingly as said toggle-levers are operated by the pulling or backing of the locomotive; second, to provide with two separate and independent toggle-levers coupling devices, by means of which the said toggle-levers, respectively, will be readily connected with the locomotive and tender; third, to provide means by which the reversed angles of inclination of the forward limbs of the two toggle-levers can be readily changed at will, so that the degree of lift of the forward end of the tender can be varied to increase or lessen the same, as may be advantageous, by reason of the grade of the road or amount of load behind the tender; fourth, to provide with the two reversed toggle-levers and their coupling attachments a flexible connection between one of these toggle-levers and the tender, which can be operated at will to limit the extent of movement of the limbs of the same, and thereby limit the lift of the forward end of the tender in relation to the locomotive; and, further, to provide particular combinations of parts and elements by which my improvements can be made readily applicable to locomotives and their tenders generally as they are now found to be constructed. I attain these objects by the means illustrated in the several drawings forming a part of this specification, in which—

Figure 2:
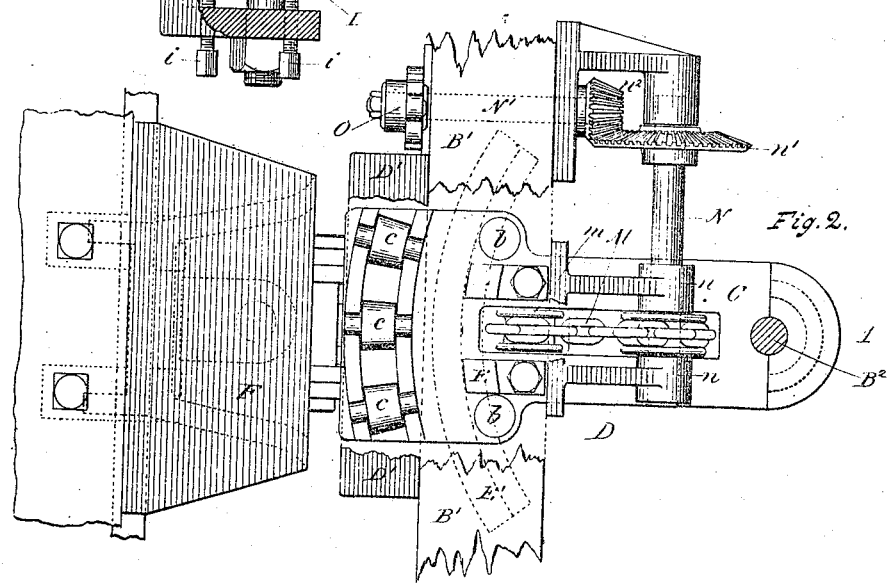
Figure 3:
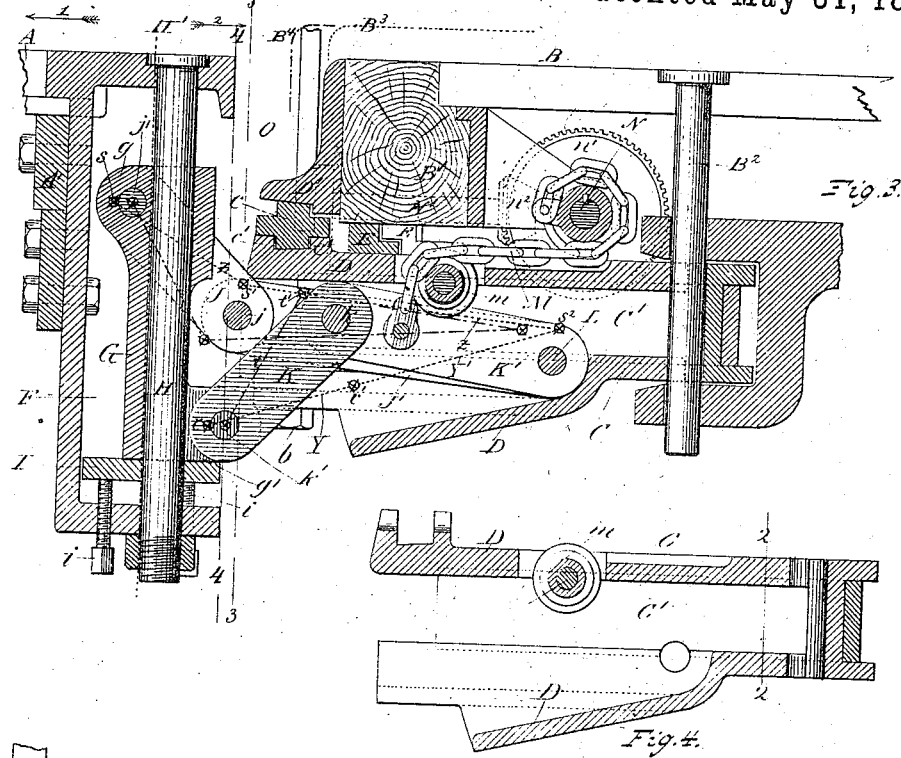
Figure 4:
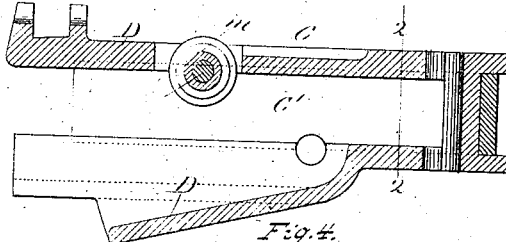
Figure 5:
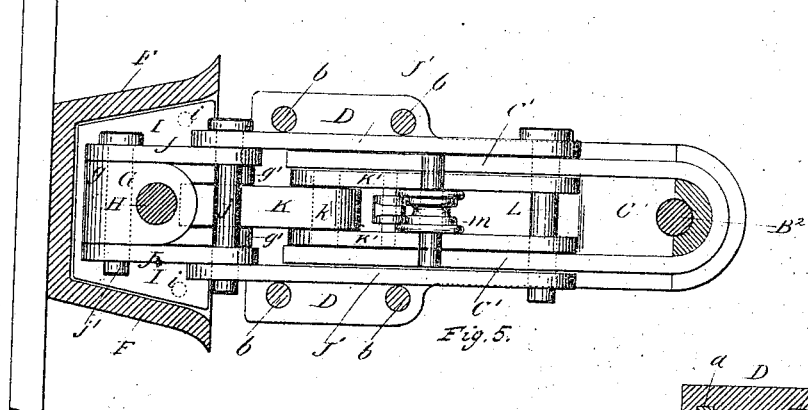
Figure 6:
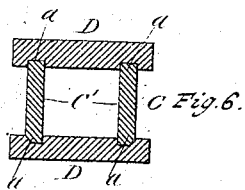
Figure 10:
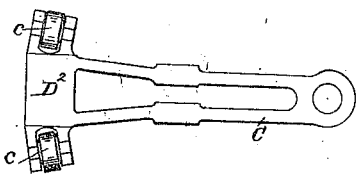
Figure 11:
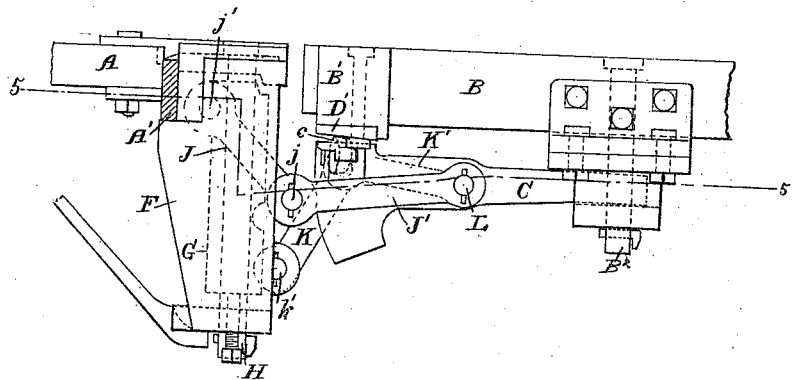
Figure 12:
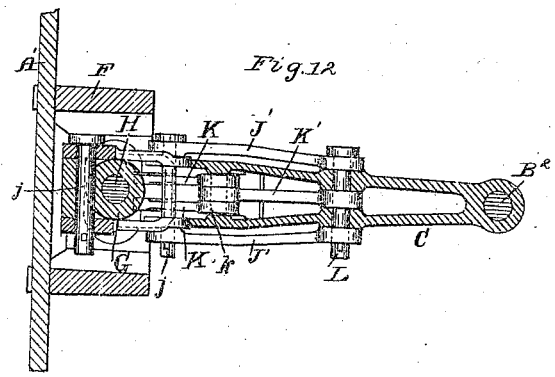

Figure 1 is a side elevation of my invention applied between the locomotive and its tender for connection of the latter with the former. Fig. 2 is a plan view of the same. Fig. 3 is a sectional elevation taken from front to rear. Fig. 4 is a sectional view of the horizontally-oscillating coupling-bar which can be employed. Fig. 5 is a plan view of the several parts in my invention, illustrating their relative arrangements and manner of connection with each other, the upper plate of the coupling-bar being removed, and the top portion of the sleeve-housing also being removed to expose the several parts. Fig. 6 is a cross-sectional view of the coupling-bar, taken at line 2 in Fig. 4. Fig. 7 is a view of the front end of the tender and the coupling-bar and toggle-lever limbs, taken at lines 3 in Fig. 3. Fig. 8 is a view of the sleeve-housing, sleeve, and their adjuncts carried by the locomotive, taken at line 4 in Fig. 3. Fig. 9 is a view illustrating the relative movements of the limbs of the respective toggle-levers when the sleeve is lowered. Fig. 10 is a plan view of the horizontally-oscillating coupling-bar when made to consist of a single piece. Fig. 11 is a side elevation illustrating the coupling-bar made of a single piece, with the coacting parts modified in form when made of cast cast-steel. Fig. 12 is a horizontal view of the same, taken at line 5 in Fig. 11.

The same letters of reference refer to like parts throughout the several views.

A represents the locomotive, and A' is the rear end frame portion thereof.

B is the tender, and B' is the front end sill timber or beam of the same. The locomotive can be of any known construction having two or more driving-wheels on a side and its forward end mounted on a truck, with the weight of the locomotive suitably distributed on the driving-wheels by means of the usual equalizing-springs. (Not shown.) The tender can also be of any known form of construction, and is separate and independent of the locomotive and mounted on front and rear trucks, which are provided with springs. (Not shown.)

Particular description of the locomotive and tender in their several parts is not necessary for a correct understanding of my improvements, as the construction of both is well understood.

One portion of my invention is connected with the locomotive and another portion to the tender, and these two portions are coupled together by two separate and independently-operating toggle-levers, which have the angles of their respective coacting limbs reversed, all of which will hereinafter be particularly described.

C is a horizontally-oscillating coupling-bar arranged beneath the forward end portion of the tender, with its rear end jointed with the latter by means of a suitable coupling-plate and the pin $B^2$. The drawings show this coupling-bar to be composed of sections C' and D D. In the construction shown the portion C' represents the wrought-iron or steel body, and D the stiffening-plates, which can be made of cast-iron. These pieces are shown to be united securely together by means of suitable bolts, $b\ b$, and grooves $a\ a$, made in the plates D, Figs. 5 and 7, and indicated by dotted lines in Figs. 3 and 4, hold with the edge portions of body C', to prevent a shifting of the parts when drawn together by bolts $b\ b$. If preferred, this coupling-bar can be made to consist of a single piece, as illustrated in Figs. 10, 11, and 12, and in such case I prefer to make it of cast cast-steel, with portion $D^2$ and bearings for rollers cast with it. Rollers $c\ c$, suitably mounted in bearings $c'\ c'$, connected with the forward end of the coupling-bar C, serve as friction-rollers between the bar and tender. These rollers are preferably made of steel, and their upper sides project above the plane of the upper side of the coupling-bar.

D is a metal piece suitably secured to the front sill or beam of the tender, with its face side against friction-rollers $c\ c$. The face side of this plate having bearings on these rollers is preferably of chilled iron or hardened steel.

E E, Figs. 1, 2, and 3, are suitable brackets provided with holding-lips, and connected with the upper sides of the coupling-bar C, and hold with flange-piece E'. (Shown in Figs. 1 and 3 and indicated by dotted lines in Fig. 2.) This flange-piece E is secured to the lower side of the tender, and, together with the holding-lips of brackets E, forms a suitable means for supporting the forward end of the coupling-bar while its adjuncts are being placed in position and secured or are being changed or repaired.

F is a coupling-sleeve housing having secure connection with the rear end of the locomotive by its rear frame-piece, A', and suitable bolts, stays, and braces, as will be required by reason of the peculiar construction and arrangements of the frame parts and foot-plate of the locomotive.

G is a coupling-sleeve loosely mounted on vertical shaft H, supported by housing F. This coupling-sleeve has made with its upper end the horizontally-pierced ear $g$ and the lower end-pierced ears, $g'\ g'$. The drawings show the upper ear, $g$, to be extended from the side of the sleeve toward the locomotive, while the lower ears are extended in the opposite direction; but, if selected, this order of relative arrangement of these ears can be reversed, or both can be made to extend from the same side of the sleeve; yet I prefer to arrange these ears with the body of the sleeve as shown, so that in all cases the direction of force applied to them will be relatively toward shaft H.

I is a movable step arranged between the lower end of housing F and lower end of sleeve G. This step is adjustable in a vertical direction, and can be raised or lowered at will by adjusting screws $i\ i$, screwing through the lower end portion of the housing and against the lower side of said step. If selected, cams or levers can be substituted for effecting the adjustment of this step or raising or lowering of the sleeve.

The coupling-bar C and coupling-sleeve G are coupled together by the two separate and independent toggle-levers, J J' and K K', which are shown to be reversed in the angles of inclination of their respective forward limbs, J and K, in relation to both the coupling-bar and coupling-sleeve. These toggle-levers connect. These reversed toggle-levers J J' and K K' are, for convenience, jointed with the coupling-bar C from the same joint-pin, L, (shown in Figs. 1, 3, and 5,) to be at a point a little forward of the tender-coupling pin $B^2$ and at a distance rearwardly from the forward end of said coupling-bar; yet these toggle-levers can be jointed with this coupling-bar at points between pin $B^2$ and the forward end of the bar by separate and independent joint-pins, one above the other or rearward of the other, as might be selected. The forward limbs of these reversed toggle-levers are jointed with sleeve G from ears $g'\ g'$, respectively, with pin $j'$ connecting limb (or limbs) J of the pulling toggle-lever J J' to sleeve G by its upper ear, and pin $k'$ connecting limb K of the backing toggle-lever to the same sleeve by its lower ears. The toggle-lever J J' is shown to be duplex in character, with the knuckle ends of the coacting limbs of each pair jointed by the same joint-pin, $j$. When a duplex toggle-lever, J J', is employed, I prefer to arrange each one of the pair at the outer sides of the coupling-sleeve and coupling-bar, as shown in Figs. 5, 7, and 8, with the front ends of the rearward limbs, J' J', bearing against the lower side of laterally-extended portions of the forward end of the coupling-bar, and preferably beneath the bearings of the friction-rollers $c\ c$, as shown in Figs. 1 and 7.

The reversed toggle-lever K K' is shown to be arranged between the side portions, C' C', of the coupling-bar C and between the ears $g'\ g'$ of sleeve G, with the knuckle ends of its respective limbs jointed together by pin $k$. (Shown by full lines in Fig. 3, and indicated by dotted lines in Fig. 5.) If selected, toggle-levers J J' and K K' can have their order of arrangement with the coupling bar and sleeve transposed by making K K' duplex in character and lessening the number of members composing toggle-lever J J', or otherwise suitably modifying the parts thereof.

In the connection of these reversed togglevis and Craven, January 30, 1883, and Letters Patent No. 311,963, to T. C. Craven, February 10, 1885, in both of which patents are shown the same two-part or jointed draw-bars employed with like essential devices and elements which are identically the same in number, form, function, and order of arrangement with each other, the difference being that in Patent No. 311,963 the several parts and elements constituting the whole appliance are together inverted, as a whole, in their arrangement between the locomotive and tender, and also reversed in the order of their connections with the same from that shown in the older patent, No. 271,269; but as the two-part or jointed draw-bars and their necessary coacting joint and supporting or bearing pieces (shown in these older patents) cannot be used in connection with my coupling-bar C and coupling-sleeve G, they form no part of my invention, and are not claimed by me. I am also aware that a backing-strut having one end jointed at an angle with a draw-bar and its opposite end loosely working into a socket made in an unconnected piece, with the jointed ends of the bar and strut bearing against a piece which receives the weight of the tender, is old, as shown in the patents before referred to; but as such jack-struts cannot be used in connection with my coupling-bar and coupling-sleeve, and could not be used in connection with my toggle-lever J J', they form no part of my invention, and are not claimed by me.

By my above-described improvements, first, by the employment of the toggle-levers and coupling-bar, I dispense with the old slotted draw-link, which permitted longitudinal play of the same, and consequently a pounding of the same on its draw-pin, which greatly contributed to its rapid and excessive wear; second, by employing the coupling-bar and coupling-sleeve with the toggle-levers jointed with the same, I dispense with the use of a backing device, which is both liable to pound and separate from its intended support, so as to be useless for transferring weight from the tender to the locomotive when the latter is backing; third, by use of the two reversed toggle-levers jointed with the coupling-sleeve and coupling-bar, I provide a reliable support to the forward end of the tender both when the locomotive is pulling and backing, and thereby dispense with the unreliable saddle, which was loosely seated against the constantly-wearing joint ends of the draw-link and draw-bar heretofore employed; fourth, by the use of my coupling-bar with its friction-rollers and bearing-plate fixed to the tender, I provide a reliable support to the forward end of the tender between it and the draw toggle-lever and backing toggle-lever, and thereby dispense with the old jointed draw link and bar and the saddle heretofore used and loosely mounted on the jointed ends of the former, and which was liable to become displaced and broken, so as to render the parts inoperative for their intended purposes; fifth, by the employment with the coupling-bar and the two toggle-levers jointed thereto, and the vertically-adjustable coupling-sleeve, also jointed with said toggle-levers, I provide a reliable and simple means for holding both the backing and pulling devices, and am enabled to simultaneously adjust the angles of the limbs of the two toggle-levers, so as to better adapt the coupling for its work with the grade of the road run on or speed of the train; sixth, by the employment of the coupling-bar, friction-rollers mounted on its forward end, bearing-plate fixed to the tender, two reversed toggle-levers jointed with the coupling-bar, adjustable sleeve jointed with said toggle-levers and mounted on the vertical shaft carried by the locomotive, I dispense with the use of all the unreliable parts in the old traction-increasing bars, and provide in a coupling device parts which are strong and not liable to rapid wear, displacement, breakage, and pounding, and which together are effective for so increasing the tractive power of the locomotive as to make it equal to its piston-power; and, further, I am enabled, by means of the flexible connection and mechanism for operating the same, to prevent at will the draft on the toggle-levers causing a lift of the tender, and thereby can prevent any weight being transferred from the same to the drive-wheels of the locomotive, or permit at will the said toggle-levers to have only a limited extent of movement, and thereby allow only a limited extent of lift of the tender and a transfer of only a limited portion of the weight of the tender to be transferred to the drive-wheels of the locomotive.

Having described my invention, what I claim is—

1. In a traction-increasing coupler for locomotives, the combination and arrangement, with a horizontally-oscillating coupling-bar which has its rear end pivoted with the tender and its forward end provided with friction-rollers bearing against a piece rigidly fixed to the forward end of the same, and a horizontally-oscillating sleeve which is connected with the locomotive, so as to be capable of vertical adjustment in relation to the plane of the coupling-bar, of the pulling toggle-lever J J', having its forward limb, J, jointed with said sleeve at a point above the plane of the joint-pin of said toggle-lever, and its rearward limb, J', jointed with the coupling-bar at a point distant and rearward from the friction-rollers, so that its forward end portion will support the forward end of said coupling-bar while the latter is supporting the forward end of the tender, substantially as and for the purposes set forth.

2. In a traction-increasing coupler for locomotives, the combination, with the horizontally-oscillating coupling-bar which has its rear end jointed with the tender and its forward end provided with friction-rollers bearing against a piece rigidly fixed to the front end of the same, and a horizontally-oscillating sleeve connected with the locomotive, so as to levers with the coupling-bar and sleeve, and their relative arrangement with the same and each other, each toggle-lever can be operated for raising the fore part of the tender, the same as if the other were omitted from connection of the bar with the sleeve, and each will serve as a connection between the tender and locomotive through sleeve G and bar C independently of the other. When the locomotive is pulling hard, the angle of the limbs of the toggle-lever J J' will be changed more or less by their jointed knuckle ends being forcibly lifted by the draft toward a straight line drawn from the center of pin L to center of pin j', and in this rise of these jointed knuckle ends the fore part of the rearward limbs, J', of this toggle-lever will be forced upward against the lower side of the laterally-projected top portions of the coupling-bar, and thereby lift the forward end of the tender toward dotted lines B³, when the weight of the tender (removed from the springs of the forward truck) will be transferred to the driving-wheels of the locomotive. In this operation the distance between the tender and locomotive will be slightly increased, and the limbs of the reversed toggle-levers K K' will have their angle correspondingly straightened out in the opposite direction.

When the locomotive is backing hard, it will slightly approach toward the tender and force the lower end of the forward limb, K, of the backing toggle-lever to a short distance rearwardly, when the knuckle ends of the two limbs K K' will be elevated in relation to their normal positions, and force upwardly the forward end of the coupling-bar C, and cause it to lift the forward end of the tender to a short distance, when the weight of the same (from the truck-springs) will be transferred through the forward limb, K, sleeve G, and housing F to the drive-wheels of the locomotive. Arranged between one of these toggle-levers and the tender is a flexible connection and a suitable mechanism for tightening or slackening the same at will, for limiting the movement of the limbs of said toggle-levers, or holding the same at particular angles, or holding them from being moved from their respective normal positions or angles, so that the hard pulling of the locomotive will not effect a transfer of any weight from the tender to the locomotive.

My preferred flexible connection consists of a strong chain, M, suitably connected with limbs K' of toggle-lever K K', and working over loose roller n, having bearings in coupling-bar C, and connecting with shaft N, which is mounted in bearings secured to the tender, so as to be capable of being wound on or off from the same at will, accordingly as the shaft is turned. Shaft N is operated, preferably, by gears n' and n², and shaft N' with the latter revolved by means of a lever, O, loosely working on the shaft, and provided with a pawl, P, pivoted with said lever and engaging with ratchet-wheel Q, fixed to said shaft, as shown. A dog, R, pivoted on the tender and engaging with ratchet-wheel Q, operates to hold shaft N from being turned back. When shaft N is turned to wind on chain M, the knuckle ends of toggle-lever K K' will be drawn up against the lower side of the top portion of the coupling-bar C, and when said shaft is secured from turning back by means of dog R the angle of the limbs of said toggle-lever will be held from being changed. Consequently, when the locomotive is pulling, the draft of the same will be equal on both toggle-levers, and not be only on toggle-lever J J', as when the limbs of toggle-lever K K' are free to move down from the upper side of the coupling-bar. When chain M is wound up on shaft N, to allow the limbs of the backing toggle-lever K K' to move down to a short distance, the lift of the tender by the pull of the locomotive on the pulling toggle-lever J J' will be limited, and a less amount of weight of the tender will be transferred to the drive-wheels of the locomotive. When sleeve G is raised by adjusting-screws i and step I from position shown in Fig. 3, the angles of the respective toggle-levers will be so changed that with the same draft force and same resistance a greater lift of the tender will be effected, and consequently a transfer of a greater amount of weight from the tender to the drive-wheels of the locomotive will also be effected, and when the said sleeve is lowered, as illustrated in Fig. 9, the angles of these toggle-levers will again be so changed that there will be less lifting force attending the draft on the draft toggle-lever, and a transfer of a less amount of the weight of the tender to the drive-wheels of the locomotive will be effected. When these toggle-levers are free to move and the locomotive is moving forward in direction of arrow 1, Fig. 3, and there is but little load behind the tender, the draft on the draw toggle-lever J J' will effect but a little lift of the fore part of the tender and but a small transfer of weight of the same to the drive-wheels of the locomotive; but accordingly as the load is increased—either by the increase of number of cars or grade of the road or speed of the train—the lift of that toggle on the fore part of the tender will be increased and the weight transferred to the locomotive will be correspondingly increased, so that the tractive power of the locomotive will be made to be equal to the piston-power of the same. When the locomotive is moved back toward the tender in direction of arrow 2, Fig. 3, the same results will be had under like circumstances of load, grade of road, and speed of train through the backing-toggle.

I am aware that two-part or jointed draw-bars for connection of locomotives with their tenders—in which the parts are flexibly connected and arranged at an angle to each other, with their jointed ends having bearing against a piece which receives the weight of the tender as the draw-bar is pulled on—are old, as instanced in Letters Patent No. 271,269, to Purbe capable of vertical adjustment in relation to the plane of the coupling-bar, of the backing toggle-lever K K', having its forward limb jointed with said sleeve at a point below the plane of the joint-pin of this toggle-lever, and its rearward limb, K', jointed to the coupling-bar at a point rearward of the friction-rollers, so that the knuckle ends of the said two limbs of this toggle-lever will support the forward end of the coupling-bar while the latter is supporting the front end of the tender, substantially as and for the purposes set forth.

3. In a traction-increasing coupler for locomotives, the combination, with the horizontally-oscillating sleeve which is connected with the locomotive, and the horizontally-oscillating coupling-bar which is connected by its rear end with the tender, of the pulling toggle-lever J J', jointed with both said sleeve and said coupling-bar, so that its joint with the former will be at a point relatively above the plane of the joint-pin of the toggle-lever with the latter, and the joint of the toggle-lever with the coupling-bar be between the forward end of the latter and its tender coupling-pin, with the rearward limb of this toggle-lever operating to support the forward end of the coupling-bar while the latter operates to give support to the tender, substantially as and for the purposes set forth.

4. In a traction-increasing coupler for locomotives, the combination, with the horizontally-oscillating sleeve jointed with the locomotive and the horizontally-oscillating coupling-bar jointed with the tender, of the two reversely-arranged toggle-levers J J' and K K', having separate and independent knuckle-joint pins, and both jointed with said sleeve and coupling-bar, the forward limb of toggle-lever J J' being jointed with the sleeve at a point relatively above the joint-pin in the knuckle ends of the two limbs of said lever, the forward limb of toggle-lever K K' being pivoted with said sleeve at a point relatively below the knuckle ends of the limbs of that lever, while the rearward limbs of these reversed toggle-levers articulate on the same joint-pin from the coupling-bar at a point in the same between its forward end and its tender-coupling pin, so that the coupling-bar at all times will be made to support the forward end of the tender by the alternate operations of these reversely-arranged toggle-levers, accordingly as the locomotive is pulling or backing, substantially as and for the purposes set forth.

5. In a traction-increasing coupler for locomotives, a connection between a horizontal coupling-bar which has its rear end coupled with the tender, so that its forward end will operate to support the forward end of the tender when lifted, consisting of the sleeve G, loosely mounted on a vertical shaft which is connected with the locomotive, and a toggle-lever having its rearward limb pivoted with the coupling-bar at a point between its front and rear ends, and its forward limb pivoted with said sleeve at a point relatively above the joint-pin of the two limbs, substantially as and for the purposes set forth.

6. In a traction-increasing coupler for locomotives, the combination, with two inclined toggle-lever limbs, J and K, which are arranged at reversed angles to each other and to the line of direction of the coupling-bar they are to alternately force upward for raising the tender by the pull and push of the locomotive, respectively, of a sleeve with which both said toggle-levers are jointed by separate joint-pins, and which can be raised or lowered and adjusted at will on a vertical shaft connected with the locomotive, so as to simultaneously change the angles of both said toggle-limbs, and thereby increase or lessen the extent and power of said two limbs for lifting the load on the said coupling-bar, substantially as and for the purposes set forth.

7. In a traction-increasing coupler for locomotives, the combination of two toggle-levers which are arranged between the locomotive and tender, with the angles of their respective coacting limbs reversed, a coupling device connected with the locomotive and jointed by separate and independent joint-pins with the forward limbs of these toggle-levers, and a coupling-bar jointed with the tender, and also jointed with the rearward limbs of said toggle-levers, so that said rearward limbs will alternately lift up said coupling-bar when their respective coacting links are operated by the pull and push, respectively, of the locomotive, substantially as and for the purposes set forth.

8. In a traction-increasing coupler for locomotives, the combination, with two toggle-levers which are connected with a coupling-bar having a joint-connection with the tender, and a sleeve loosely mounted on a vertical shaft connected with the locomotive and jointed from its opposite ends, respectively, with the forward limbs of said toggle-lever, of a movable step supporting said sleeve and adjustable at will in a vertical direction, substantially as and for the purposes set forth.

9. In a traction-increasing coupler for locomotives, the combination, with two toggle-levers which are adjusted at opposite angles and have independently-jointed connections with a coupling device connected with the locomotive, and also jointed connections with a piece connected with the tender, of a flexible connection, M, between one of said toggle-levers and a shaft having bearings in the tender, and operated at will to tighten or loosen said flexible connection, substantially as and for the purposes set forth.

ALEXANDER SELKIRK.

Witnesses:
CHARLES WETHERWAX,
CHARLES SELKIRK.